United States Patent [19]

Levin

[11] 4,168,122

[45] Sep. 18, 1979

[54] LIGHT EXPOSURE DEVICE INCLUDING SPECULAR REFLECTIVE AND LIGHT-DIFFUSING SURFACES THEREIN

[75] Inventor: Robert E. Levin, South Hamilton, Mass.

[73] Assignee: GTE Sylvania Incorporated, Stamford, Conn.

[21] Appl. No.: 893,554

[22] Filed: Apr. 5, 1978

[51] Int. Cl.² .............................................. G03B 27/04
[52] U.S. Cl. .................................................... 355/113
[58] Field of Search .................. 355/21, 77, 113, 120, 355/115, 119, 121, 63, 32, 35, 37, 38, 67-71

[56] References Cited

U.S. PATENT DOCUMENTS

| 767,571 | 8/1904 | Lande | 355/70 |
|---|---|---|---|
| 2,813,456 | 11/1957 | Ostrov | 355/21 |
| 3,270,194 | 8/1966 | Pui Kum Lee | 355/119 X |
| 3,498,714 | 3/1970 | Elmer | 355/70 |
| 3,715,156 | 2/1973 | Levy | 355/113 X |
| 3,737,226 | 6/1973 | Shank | 355/67 |
| 4,050,808 | 9/1977 | Gyori et al. | 355/38 |

Primary Examiner—Donald A. Griffin
Attorney, Agent, or Firm—Lawrence R. Fraley

[57] ABSTRACT

A light exposure device including an open-ended housing with trapezoidal side walls and a rectangular top wall contiguous therewith. The internal surface of the top wall and major portions of the internal surfaces of the side walls are light-diffusing while the remaining portions of the side wall internal surfaces are specular reflective. These surfaces are arranged such that the reflective surfaces direct light from the device's light source to the diffusing surfaces whereby only the diffused light passes through the housing's open end. A portable copier which utilizes the above device is also described.

13 Claims, 3 Drawing Figures

LIGHT EXPOSURE DEVICE INCLUDING SPECULAR REFLECTIVE AND LIGHT-DIFFUSING SURFACES THEREIN

CROSS REFERENCE TO RELATED APPLICATIONS

An application entitled "Copy Apparatus Using Chemical Flashlamp" (Inventor: T. Fohl) was filed May 13, 1977 and listed in the Patent and Trademark Office under Ser. No. 796,795. This application is now U.S. Pat. No. 4,129,380 and defines a portable, low cost copier for use with photosensitized papers and utilizes a chemical flashlamp as the source of illumination.

An application entitled "Flashlamp Assembly With Tapered Housing" (Inventors: R. Bonazoli, W. Morgan) was filed July 5, 1977 and listed in the Patent and Trademark Office under Ser. No. 812,916. This application is now U.S. Pat. No. 4,113,420 and defines a flashlamp assembly which can be used as the light source in U.S. Pat. No. 4,129,380 as well as in the present invention.

Another application, entitled "Light Exposure Device Including Light Diffusing and Absorbing Regions Therein" (Inventors: R. Levin, G. English), was also filed July 5, 1977 and listed in the Patent and Trademark Office under Ser. No. 812,833. This application is now U.S. Pat. No. 4,128,333. The housing in the device of U.S. Pat. No. 4,128,333 includes diffusing regions near the light source which direct light toward the housing's open end and the absorbing regions so that only a portion of the light will pass through the opening. The result is substantially uniform irradiation, that is, a change in intensity no greater than 7 percent.

All of the aforementioned applications are assigned to the assignee of the present invention.

BACKGROUND OF THE INVENTION

The present invention relates to light exposure devices and particularly to light exposure devices for use in portable reflex copying systems.

Many prior art copy systems possess several inherent disadvantages including large size, high cost, and a requirement for continued maintenance. Smaller copiers exist but these typically require complex reflector and optical arrangements, thus also rendering these units very expensive and susceptible to misalignment.

The device defined in the aforementioned U.S. Pat. Nos. 4,128,333 and 4,129,380 represent substantially improved embodiments over the prior art in that they may be produced at lower costs, are easier to operate, and yet still provide substantially uniform outputs. Variation in intensity levels of no greater than from about 5 to 7 percent are typical.

The present invention provides the above advantageous features and thus represents still another improvement over the prior art. As will be understood from the following description, the present invention possess even further advantages in manufacturing design and processing over the above improved devices, particularly the device in U.S. Pat. No. 4,128,333. It is believed that such an improvement constitutes an advancement in the art.

OBJECT AND SUMMARY OF THE INVENTION

It is therefore a primary object of the present invention to provide a light exposure device having the above desired features.

It is another object of the invention to provide such a device which is especially suited for use as a portable reflex copier.

In accordance with one aspect of the invention, a light exposure device is provided which comprises an open-ended housing having a light source therein. Within the housing are a plurality of light-diffusing and specular reflective surfaces, said surfaces arranged such that the light which strikes the reflective surfaces is directed toward the diffusing surfaces. Accordingly, only the diffuse light is permitted to pass through the housing's open end.

According to another aspect of the invention, a portable reflex copier is provided which includes the aforementioned light exposure device, a light-transmitting platen, and a layer of photosensitive material located adjacent the device's platen. The photosensitive material absorbs a portion of the light which passes through the platen and is reflected back from selected areas within the original being copied.

DETAILED DESCRIPTION OF THE PREFERRED EMBODIMENTS

For a better understanding of the present invention together with other and further objects, advantages and capabilities thereof, reference is made to the following disclosure and appended claims in connection with the above-described drawings.

Figure 1:
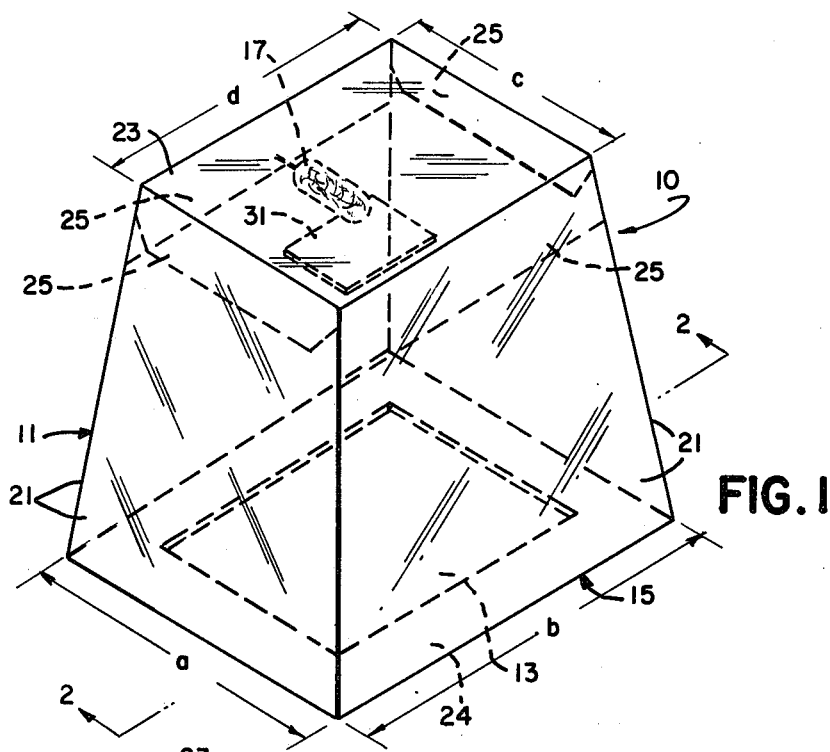
FIG. 1 is an isometric view of a light exposure device in accordance with a preferred embodiment of the invention.

With particular reference to FIG. 1, there is shown a light exposure device 10 in accordance with a preferred embodiment of the invention. Device 10 is capable of providing substantially uniform irradiation to an original (e.g. contact print, document, etc.), said irradiation having a change in intensity no greater than about 5 percent. Such a small differential makes the present invention ideally suited for use as a reflex copier.

Device 10 comprises a housing 11 having at least one opening 13 located within an end 15 thereof. A light source 17 is positioned within the upper portion of housing 11. A preferred light source for use with the invention is a chemical flashlamp, which typically emits a relatively highly intense flash of light over a brief time period. Such lamps usually comprise a sealed glass envelope containing a combustible material and a combustion-supporting atmosphere. An example is shown in U.S. Pat. No. 3,535,063, the disclosure of which is incorporated herein by reference, U.S. Pat. No. 3,535,063 is assigned to the assignee of the present invention. Other types of chemical flashlamps can also be used, including those which are electrically activated such as by a high voltage pulse from a piezoelectric crystal. An example is described in U.S. Pat. No. 4,008,040, which is assigned to the assignee of the instant invention and is also incorporated herein by reference. As earlier stated, the present invention is also capable of using the flashlamp assembly described in U.S. Pat. No. 4,128,333.

The present invention is not limited to the use of chemical flashlamps, however. Other varieties of lamps, including controlled strobe, incandescent, and tungsten-halogen, may be successfully used herein. Chemical flashlamps are preferred because of the inherent low cost and uniform output of such components.

As is well known, reflex copy systems must be sensitive enough to respond to minor differentials in absorbed energy. It can readily be seen, therefore, that a light exposure device capable of providing irradiation uniformity within the range defined would provide a significant advancement in the art. The present invention assures this high degree of uniformity by utilization of a plurality of specular reflective and light-diffusing surfaces within housing 11 which are arranged such that only diffused light from source 17 passes through opening 13. That is, the specular reflective surfaces only direct the light impinging thereon toward the light diffusing surfaces or, in some cases toward other reflective surfaces which then direct it to the diffusing surfaces. With regard to the invention, by specular reflective is meant a type of reflection in which the angle between an incident ray of light and a normal to the surface will equal the angle between the normal and the respective, reflected ray. Preferred materials for use as specular reflective surfaces include mirrored glass, and polished and electroplated metals (e.g. gold, copper, aluminum). Both front and rear silvered glass mirrors may be used.

With added regard to the invention, by light-diffusing is meant a type of reflection in which each single incident ray is reflected over a range of essentially $2\pi$ steradians. Accordingly, an approximate uniform surface brightness is provided at all viewing angles. A preferred light-diffusing material for use in the invention is white paint having a matte finish. Other flat paints and matte finishes are also possible.

Housing 11 includes a plurality of substantially planar, sloping side walls 21 and a planar top wall 23 contiguous to each side wall. Side walls 21 are preferably established at an angle ($\theta$) within the range of about 100 to 110 degrees with the top wall 23. Housing 11 also preferably includes a planar bottom wall 24 in which is centrally located opening 13. Bottom wall 24 is parallel to top wall 23 and is also preferably rectangular.

In one embodiment of the invention, device 10 is particularly adapted for reflex coping $8'' \times 10''$ contact prints. Accordingly, opening 13 is rectangular and is also of this dimension. Bottom wall 24 has a width (dimension "a") of 10.5 inches and length (dimension "b") of 13.0 inches. The corresponding dimensions for top wall 23 are 8.5 inches (dimension "c") and 9.0 inches (dimension "d"), respectively. Housing 11 has an overall height (dimension "h") of 9.0 inches.

Figure 2:
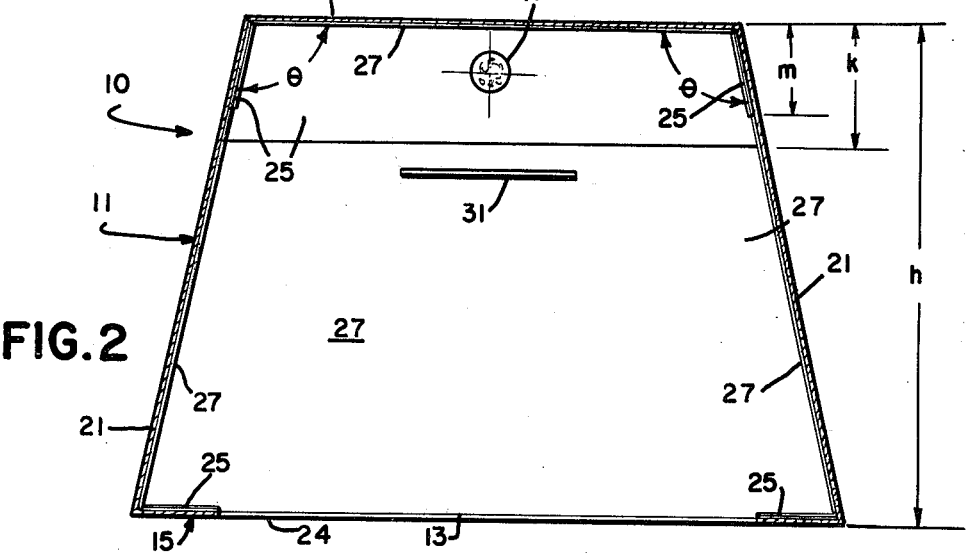
FIG. 2 is a side elevational view, in section, of the invention as taken along the line 2—2 in FIG. 1.

As illustrated, side walls 21 are each of trapezoidal configuration with the parallel edges being those contiguous to top and bottom walls 23 and 24, respectively. Located on the uppermost portion of each side wall 21 is a specular reflective surface 25, the function of which is to direct the light impinging thereon toward a light-diffusing surface 27 located on the remaining, lower portion of an opposing side wall 21. Light-diffusing surfaces 27 occupy the remaining portions of side walls 21, as illustrated in FIGS. 1 and 2. That is, the internal surfaces of each wall 21 includes both a reflective and a diffusing portion thereon, and together these portions occupy the entirety of each surface. It is also preferred that top wall 23 includes a light-diffusing surface 27 thereon.

It is further shown in the drawings that on one opposing pair of side walls (those having the greater top and bottom dimensions), the reflective surfaces extend lower than those on the adjoining side walls. In the embodiment of the invention as described above, this distance (dimension "k") is about 2.3 inches. The corresponding distance (dimension "m") for the adjoining, opposing reflective surface on the smaller walls 21 is about 1.3 inches. It is also preferred in the present invention that two corners of each of the latter surfaces be truncated, as shown in FIG. 1. In the configuration shown, truncation was deemed necessary to prevent a completely specular path from lamp 17 to opening 13. Those reflective surfaces on the larger side walls are trapezoidal in shape. As further shown in the drawings, bottom wall 24 includes a specular reflective surface 25 thereon, said surface surrounding opening 13.

The aforedescribed configuration for surfaces 25 and 27 serve to prevent localized hot spots at opening 13 or on a light-transmitting platen 29 (FIG. 3) located therein. Such multiple specular reflections would of course adversely affect the illuminance uniformity of device 10.

To prevent the light from lamp 17 from directly passing through opening 13, an opaque masking member 31 in positioned immediately below the lamp. Member 31 is rectangular having a width of 2.7 inches and a length of 3.4 inches, and is suspended approximately 2.7 inches from top wall 23 in a parallel relationship therewith. Various means well known in the art are possible for supporting member 31 within housing 11, and, for clarification purposes, are not shown in the drawings.

Figure 3:
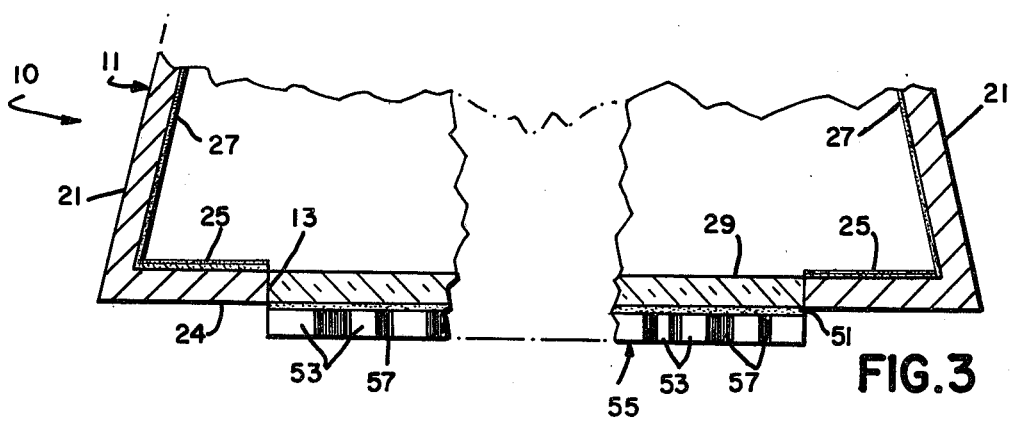
FIG. 3 is a partial, side elevational view of a portable reflex copier in accordance with a preferred embodiment of the invention.

In FIG. 3, there is shown a portion of housing 11 which includes the described planar light-transmitting platen 29 located within the housing's opening 13. Platen 29 is preferably from about 0.125 to 0.250 inches thick. As earlier stated, a desired use for the previously defined light exposure device is as part of a portable reflex copier. Accordingly, device 10 is provided with a layer of suitable photosensitive material 51 which is positioned adjacent platen 29 and is adapted for receiving light passing through the platen and reflecting off selected reflective areas 53 within an original 55 back toward the platen. Original 55, which may consist of an ordinary document, sheet of typewritten paper, etc., typically contains the aforementioned reflective areas 53 in addition to darkened, absorptive areas 57. Understandably, the absorptive areas will tend to absorb rather than reflect the light from platen 29 striking original 55.

In operation, device 10 is located above original 55 such that photosensitive material 51 is positioned on and in immediate contact with the original. The device's light source is triggered and an exposure is completed to provide a reflex copy on material 51. Device 10 thus readily serves as a portable, compact reflex copier when utilized in the above combination. Examples of suitable photosensitive materials 51 for use within the invention are described in U.S. Pat. Nos. 3,121,162 (Roman et al), 3,515,552 (Smith), 3,740,220 (De Haes et al), and 3,811,773 (Urancken), said disclosures incorporated herein by reference.

There has been shown and described a light exposure device which is compact, easy to operate, relatively inexpensive to produce, and assures uniform exposure of a respective original. The device may be used for several purposes, including exposure of contact prints, etc. or it may constitute part of a reflex system which further includes a suitable photosensitive paper or material for obtaining the desired copies. The utilization efficiency of light in the above defined embodiment of the invention, when used with a typical document such as a sheet of typewritten paper, is approximately 31 percent. This represents a gain of about 20 percent over the utilization efficiency of the device defined in U.S. Pat. No. 4,128,333 which included several directional reflective and light absorptive surfaces therein.

It is preferred to utilize some form of exposure compensation with the present invention, due to the sensitivity of the system to document reflectance. One example would be to use flashlamps having different outputs, one lamp for dark originals and the other for lighter ones. Another example would be to insert a neutral density film over light originals.

While there have been shown and described what are at present considered the preferred embodiments of the invention, it will be obvious to those skilled in the art that various changes and modifications may be made therein without departing from the scope of the invention as defined by the appended claims.

What is claimed is:

1. A light exposure device comprising a housing having a plurality of sloping side walls and a top wall contiguous to each of said side walls, said housing including a light source therein and having an opening at one end thereof, said housing further including therein a plurality of specular reflective surfaces and a plurality of light diffusing surfaces, each of said side walls of said housing having one of said specular reflective surfaces located on a portion thereof near said top wall, said specular reflective surfaces arranged to reflect the light from said light source onto said light-diffusing surfaces such that only the light from said light-diffusing surfaces passes through said opening at said end of said housing.

2. The light exposure device according to claim 1 wherein each of said sloping side walls and said top wall contiguous to each of said side walls are planar.

3. The light exposure device according to claim 2 wherein the remaining portions of each of said sloping side walls include one of said light-diffusing surfaces thereon.

4. The light exposure device according to claim 3 wherein the number of said side walls is four, each of said walls trapezoidal in configuration.

5. The light exposure device according to claim 4 wherein the specular reflective surfaces on one opposing pair of said side walls are each trapezoidal in configuration.

6. The light exposure device according to claim 5 wherein at least two corners of each of the specular reflective surfaces on the remaining opposing pair of said side walls are truncated.

7. The light exposure device according to claim 2 wherein said top wall is substantially rectangular is configuration and includes one of said light-diffusing surfaces thereon.

8. The light exposure device according to claim 2 wherein said housing further includes a substantially planar bottom wall, said opening located within said bottom wall.

9. The light exposure device according to claim 8 wherein said bottom wall includes one of said specular reflective surfaces thereon.

10. The light exposure according to claim 9 wherein said bottom wall and said opening are each substantially rectangular in configuration, said opening centrally positioned within said bottom wall.

11. The light exposure device according to claim 1 including an opaque masking member positioned within said housing between said light source and said opening.

12. The light exposure device according to claim 1 further including a light-transmitting platen positioned within said opening of said housing.

13. The light exposure device according to claim 12 further including a layer of photosensitive material located immediately adjacent said light-transmitting platen for receiving the light from said platen and adapted for being positioned against an original, said photosensitive material absorbing at least a portion of the light which passes through said photosensitive material and is reflected from selected areas within said original back toward said platen, said light exposure device comprising a portable reflex copier.

* * * * *